United States Patent Office 3,176,175
Patented Mar. 30, 1965

3,176,175
ELECTRICAL COUPLINGS
Ralph L. Jaeschke, Kenosha, Wis., assignor to Eaton Manufacturing Company, Cleveland, Ohio, a corporation of Ohio
Filed Aug. 27, 1962, Ser. No. 219,483
13 Claims. (Cl. 310—105)

This invention relates to electrical couplings, and with regard to certain more specific features, to liquid-cooled couplings of the eddy-current type.

Among the several objects of the invention may be noted the provision of improvements upon liquid-cooled electrical couplings of the eddy-current type such as shown, for example, in United States Patents 2,864,015, 2,971,105 and 3,030,529, said improvements being designed to reduce slip speed and increase coupling efficiency; the provision of apparatus of the class described adapted to reduce heat losses heretofore caused under certain conditions by flow of coolant through the so-called parasitic magnetic gap of such a machine; the provision of apparatus of this class which reduces corrosion in said parasitic gap when water is used as the coolant; the provision of apparatus of the class described which reduces the size of the required associated heat exchanger when oil or the like is used as a coolant; and the provision of means for carrying out said improvements by practicable and low-cost arrangements. Other objects and features will be in part apparent and in part pointed out hereinafter.

The invention accordingly comprises the elements and combinations of elements, features of construction, and arrangements of parts which will be exemplified in the constructions hereinafter described, and the scope of which will be indicated in the following claims.

In the accompanying drawings, in which several of various possible embodiments of the invention are illustrated, FIG. 1 is an axial section of a machine embodying the invention, some parts being shown in elevation, the section being taken on line 1—1 of FIG. 2;

Corresponding reference characters indicate corresponding parts throughout the several views of the drawings.

Figure 1:
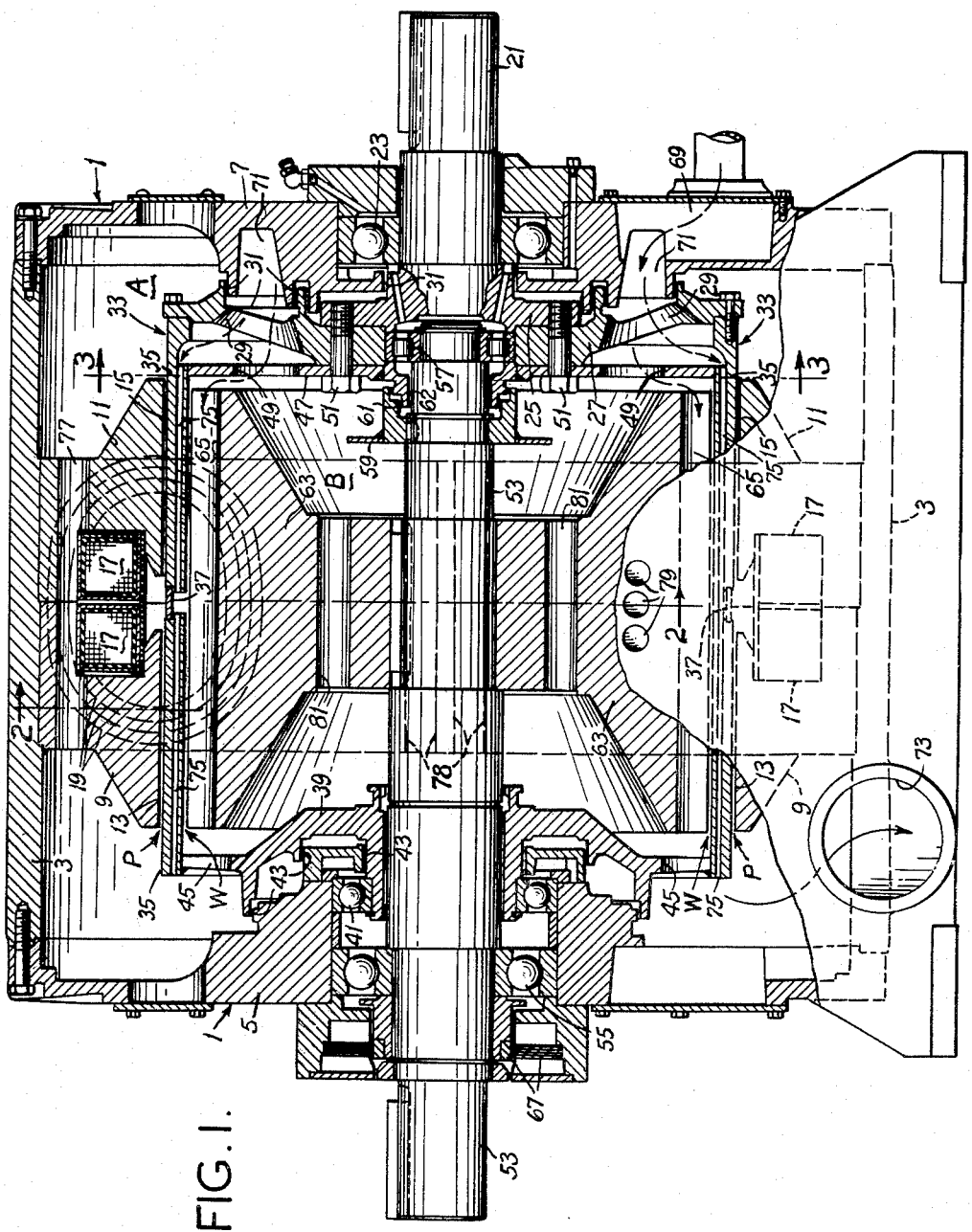

In electrical machines of the class herein considered, particularly liquid-cooled, eddy-current couplings, I have found that under certain conditions of coolant flow there may be as much as a 50 H.P. loss in a typical unit having a 200 H.P. transmission rating. The cause of this loss has been difficult to account for but I have discovered that it is due to flow of coolant through the parasitic gap of this type of machine, particularly when its working gap is crowded with coolant under conditions of substantial load, requiring a large flow of coolant for adequate heat abstraction.

Briefly then, the invention consists in providing simple and practical means for preventing or at least minimizing flow of coolant through the parasitic gap. The result, in the case of the example above given, is a reduction in power loss to approximately 6 or 7 H.P. Moreover, in the case of such machines employing water as a coolant, by reducing flow of water through the parasitic gap, corrosion therein has been reduced. In cases in which oil is used as a coolant, as for example in said Patent 3,030,529, the discharge oil temperature can be reduced from 220° F. to 150° F., for example. This reduces the heat load required to be dissipated by the oil heat exchanger, with the consequence that the size of the exchanger can be reduced.

Referring now more particularly to the drawings, there is shown in general at numeral 1 an essentially liquid-tight stationary casing or housing consisting of a cylindrical portion 3 enclosed by end bells 5 and 7. The portion 3 supports two ferromagnetic field pole rings 9 and 11, having smooth coaxial inner cylindrical surfaces 13 and 15. Between these rings are supported annular field coils 17 which by a suitable exciting circuit (not shown) generate a toroidal field diagrammatically illustrated by broken lines 19. Sidewise vents 79 are provided in portion 3 which extend to the space between the members 9 and 11, wherein the coils 17 are located. A set of such vents is employed on each side of the casing, one set only being shown. The purpose of these is to indicate flooding of the machine, should a user inadvertently permit excessive water to flow when the machine is idle.

At the right side of FIG. 1 is shown the input power shaft 21 of the coupling which is carried in bearings 23 in the end bell 7. This shaft is provided with an inner flange 25 to which is attached a spider 27 in which are coolant inlet openings 29. Annular running seals between the spider and end bell 7 radially flank the openings 29. The periphery of the spider 21 is bolted to one end of an inductor drum shown in general at numeral 33. Drum 33 consists of two ferromagnetic cylinders 35 having smooth cylindrical outer and inner surfaces. The cylinders 35 are connected by a magneto-restrictive ring 37.

Figure 3:
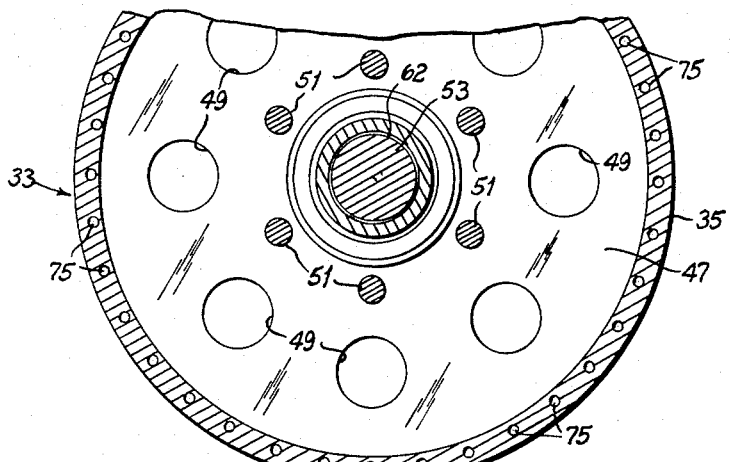
FIG. 3 is an enlarged fragmentary cross section taken on line 3—3 of FIG. 1.
Figure 4:
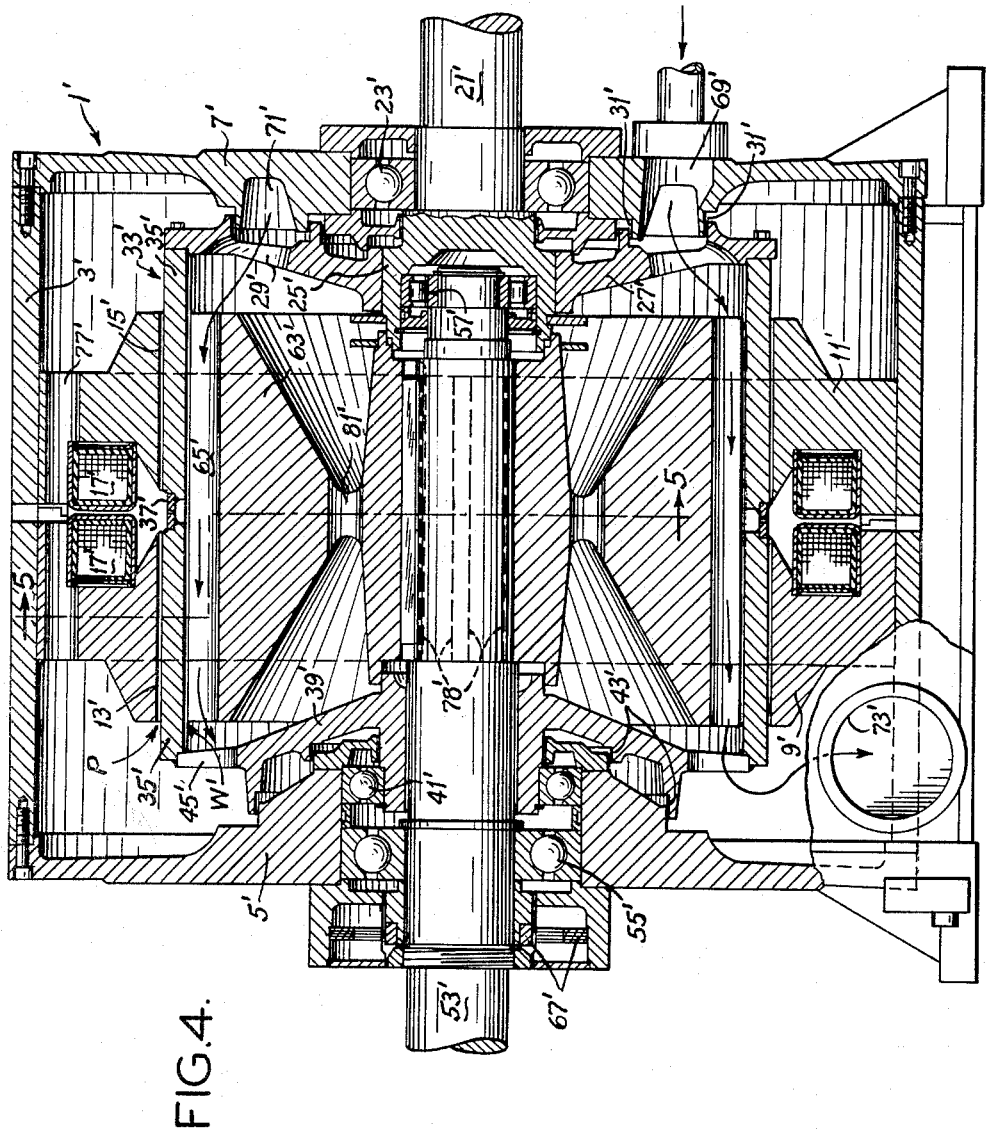
FIG. 4 is a view similar to FIG. 1, showing an alternative construction embodying the invention.

The left-hand end of the drum 33 is also supported on a spider 39 which is borne within the inner end bell 5 on a bearing 41. Running seals 43 are provided between the spider 39 and end bell 5. Spider 39 is provided with coolant exit openings 45. At numeral 47 is shown a baffle plate (FIGS. 1 and 3) which is centrally attached to the spider 27 and peripherally attached to an inner portion of the right-hand cylinder 35. This plate 47 contains openings 49 opposite the openings 29. The number and shapes of these holes may be varied. The attachments between parts 25, 27 and 47 are constituted by bolts 51. Thus the drum assembly 27, 39, 33 is supported by bearings 23 and 41 for rotation in the casing 1 and is driven by shaft 21. The cylinders 35 of drum 33 are provided with axially directed passages 75 for coolant. These provide for additional axial flow of coolant, but may be omitted, as will appear where FIG. 4 is described below.

The plate 47 functions to divide a flow of coolant entering the openings 29 into two paths as shown, one of which enters the opening 75 and the other of which enters the working gap W and the space between teeth 65 of a field pole member 63. At low cooling rates the smaller amount of coolant required is guided by plate 47 primarily into the passages 75. At higher cooling rates involving more coolant, additional amounts enter through openings 49 into the space between cylinders 35 and the teeth 65.

At numeral 53 is shown the driven shaft of the coupling, supported at one end by bearings 55 in the end bell 5 and at its other end by a pilot bearing 57 within a central opening in spider 27. An additional baffle plate 59 is attached to the shaft 53 inside of bearing 57. It has a running seal at 61 with a part 62 connected to the spider 27 and plate 47. Keyed to the shaft 53 within the drum 33 is the ferromagnetic toothed rotor or field pole member 63, the polarizing teeth or poles of which are shown at 65. The outer ends of the teeth 65 are cylindrically machined. The member 63, including its teeth 65, is ferromagnetic.

In view of the above it will be seen that there is established an inside working magnetic gap W between the rotor 63 and drum 33, and an outer so-called parasitic gap P between the drum 33 and the pole rings 9 and 11. The parasitic gap P carries throughout its periphery a part of the flux field 19 which is of substantially constant density throughout its periphery in any given plane normal to the axis of rotation of the machine. As a result, relative rotation between the drum 33 and the stationary pole rings 9 and 11 will not result in any transfer of torque across the gap P, which is the reason for reference to the gap P as being parasitic. On the other hand, the polar teeth 65 have flux-concentrating effects upon the toroidal flux field 19 so that when relative motion occurs between the field pole member 63 and the inductor drum 33, the peripheral field concentrations at any one point in the latter will vary. As a result, transfer of torque will occur across the working gap W. The amount of torque transferred is a function of the density of the toroidal flux field 19, as determined by the ampere turns of excitation in the coils 17.

At numeral 67 is a tachometer type of speed control generator carried on the end bell 5 and driven by shaft 53, the output of which is wired into the exciter control circuit (not shown) for coil 17, whereby in the usual manner a substantially constant speed may be maintained for shaft 53 under varying loads thereon and varying speeds of the shaft 21. Such control means being known, further description is unnecessary.

When shaft 21 drives and shaft 53 is loaded, relative motion occurs between the rotor 63 and drum 33. The sweep of the flux concentrations from the teeth 65 through the cylinders 35 generates eddy currents in the latter. These eddy currents generate flux fields which react with the fields from the teeth 65, whereby torque is transmitted across the working gap W. The relative motion or slip between members 63 and 33 increases with load on the shaft 53 and decreases with the intensity of flux field 19. For any given load, field intensity across the working gap W, and speed of shaft 21, there is incurred a certain slip speed. The eddy currents cause heating of the drum 33, which requires cooling means. The amount of heat increases with load, slip speed and field intensity. Thus under heavy load conditions, more cooling is required than for lighter load conditions.

In said Patent 3,030,529, means are shown whereby the amount of coolant required is automatically adjusted in volume according to the amount of heat to be extracted from the drum 33, temperature sensing means being employed to obtain automatic control.

In the end bell 7 is shown an inlet 69 for coolant, which communicates with the inside of the housing 1 through an annular passage 71 located adjacent the inlet openings 29 in the spider 27. Thus the coolant may flow as shown by the dotted-line darts. All of this flow is thrown out centrifugally within the drum 33, some passing through the drum passages 75 and into casing 1 for escape from a lower outlet 73. Another part, when the flow of coolant is sufficient, passes through the openings 49 in the plate 47. This part, if sufficient, progresses axially through the working gap W and may infill some or all of the space between the teeth 65, depending upon the amount of coolant required, which in turn depends upon the load being carried. This part of the coolant escapes from the drum 33 through the openings 45 in the spider 39 and then out of the casing 1 through the outlet 73. When water is used as a coolant it is ordinarily not necessary to reclaim it after escape from the drain 73. When more costly oil is used, it is desirable to reclaim it and cool it from its hot condition for recirculation. Such an arrangement is shown in said Patent 3,030,529.

The matters above outlined describe the type of machine which caused the problems which the invention solves. This solution consists in arranging a series of upper openings 77 (four, for example) which pass axially through the pole rings 9 and 11 and side openings 78.

One set of the openings 78 is shown, a like set being located on the opposite side of the machine. There are no bottom openings corresponding to openings 77. There is also provided a peripheral set of openings 81 passing through the neck of the rotor 63. The purpose of these will be apparent from a description of what I have found has occurred in machines of this type which did not employ openings such as 77, 78 or 81.

First, the pole rings 9 and 11 functioned as a diaphragm between the right- and left-hand ends of the machine and there was a tendency for the formation of a relatively low-pressure region or partial vacuum in the right-hand end of the casing 1 and more particularly in its upper portion, as indicated at A. This resulted in a tendency to draw water back through the parasitic gap P from left to right. This resulted in a high frictional loss due to the flow in this gap and an unnecessary additional heating of the coolant, which was already hot from having performed its cooling function in passing through the working gap W and/or the openings 75. By introducing the openings 77 through the dam formed by the pole rings 9 and 11, the pressure is equalized in both inside ends of the casing 1. Without a pressure drop through the parasitic gap P, no water tends to flow through it, which eliminates the stated losses. Absence of water from this gap has the additional advantage that corrosion and encrustations in the gap are reduced when the amount of water passing through it is eliminated or at least reduced.

Second, without the holes 81 through the neck of the rotor 63, when the radial liquid level (under centrifugal force) in the working gap W and between the teeth 65 reach the depth of these teeth, the atmospheric connection between opposite sides of the rotor 63 (acting as a diaphragm) was blocked. Crowding of the coolant caused pressure to build up at B to the right of rotor 63. This not only increased friction losses but in addition would cause a tendency to an in-filling of this space at B with coolant. This would tend to move through seals such as 61 and into the bearing 57, with resulting damage. By providing the openings 81 in the rotor neck, pressure cannot under any operating conditions build up in the area B and thus the stated energy loss and the tendency to bearing flooding is obviated or reduced. A concomitant advantage of the invention is that, for a given load carried by shaft 53, the relative slip speed between it and shaft 21 is reduced.

Figure 2:
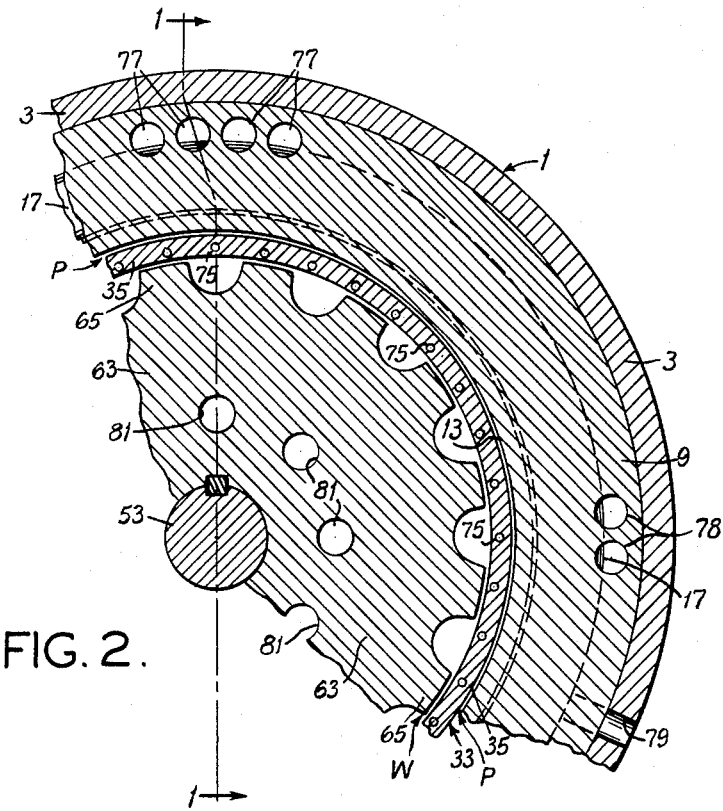
FIG. 2 is a jogged partial cross section taken on line 2—2 of FIG. 1.
Figure 5:
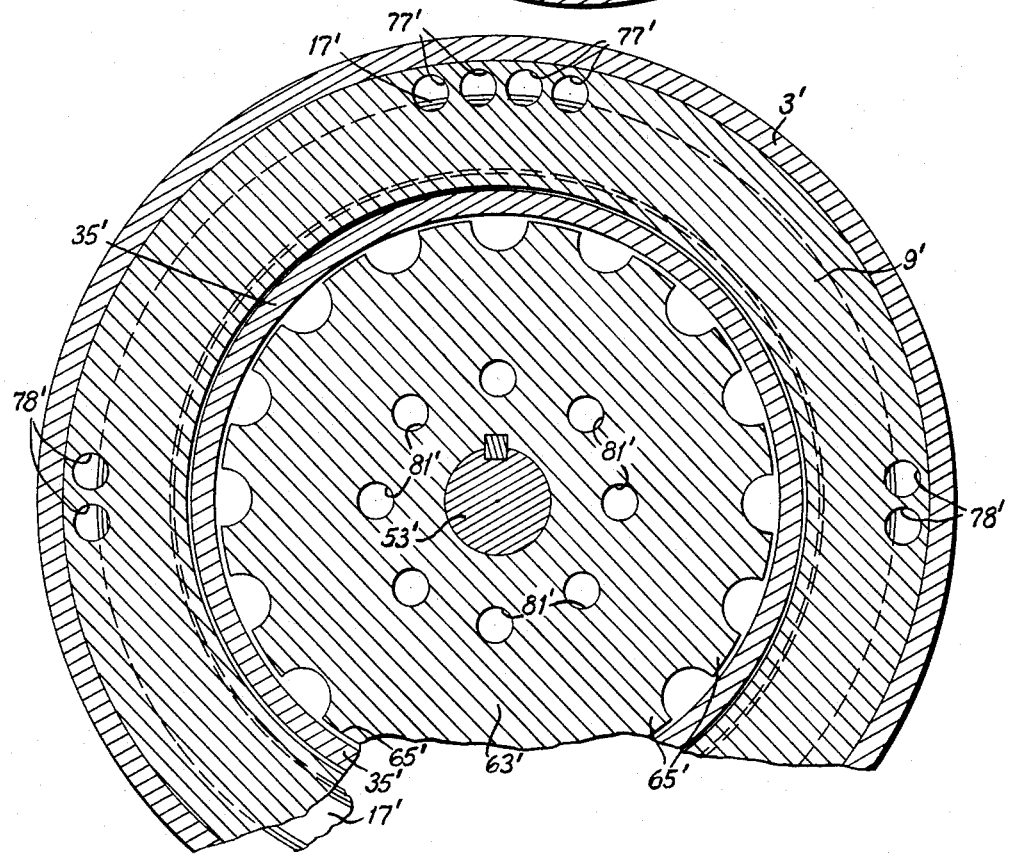
FIG. 5 is a cross section taken on line 5—5 of FIG. 4.

In FIGS. 4 and 5 is shown another embodiment of the invention in which a few modifications are employed as outlined below. However, most of the parts numbered in FIGS. 1–3 have analogous parts in FIGS. 4 and 5. Therefore, such parts have been given numerals like those used in FIGS. 1–3 except that each numeral is primed to indicate that, although it has a different detailed form, it is an equivalent of the part already described by an unprimed numeral. However, the machine of FIGS. 4 and 5 omits the holes such as 75 through the drum 33'. Omitted also is the baffle plate 47, which is not required in the absence of holes 75. The rotor 63' in FIG. 4 has a smaller waist portion at which the holes 81' are located. Otherwise the structure of FIGS. 4 and 5 is essentially the same as that described in FIGS. 1–3, and no further verbal description will be needed.

Summarizing the invention by reference to FIG. 1 (for example), the openings 77 and 78 at the top and sides of pole rings 9 and 11, by equalizing pressure on their opposite sides, prevent hot coolant from being drawn into the parasitic gap. Being in the upper portions only of rings 9 and 11, the openings 77, 78 do not carry water from left to right as would be the case if any of these were at the bottom. It will be appreciated that the connection afforded by the holes 77, 78 could be obtained by a pipe connection outside of the housing 1 across the rings 9 and 11, if desired. The openings 81 in the collar of rotor 63 prevent the build-up of pressure on the right side of the rotor 63 when the centrifugally formed water level reaches the depth of the rotor teeth 65. The holes 75, taken with the baffle plate 47 (unique to the FIGS. 1–3 form of the apparatus) when used result mainly in additional cooling capacity.

In the view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. An electric coupling comprising a casing containing pole ring means and an exciter coil therefor, a rotary inductor drum assembly within said ring means and forming an outer parasitic gap therewith, a polarized rotor within the drum assembly and providing an inner working gap therewith, means adapted to introduce coolant into one end of the drum assembly for axial movement therethrough, the drum assembly having an opening at its other end for escape of coolant therefrom after passage through said working gap, and means providing at least one pressure-equalizing opening means communicating between spaces in the casing on opposite sides of the pole ring means.

2. An electric coupling according to claim 1, wherein said pressure-equalizing opening means connects only upper portions of the casing.

3. An electric coupling according to claim 1, wherein said pressure-equalizing opening means is constituted by at least one passage through the pole ring means the casing.

4. An electric coupling according to claim 3, wherein said pressure-equalizing openings are located in upper portions of said pole ring means.

5. An electric coupling comprising a casing containing pole ring means and an exciter coil therefor, a rotary inductor drum assembly within said ring means and forming an outer parasitic gap therewith, a peripherally toothed rotor within the drum assembly and providing an inner working gap therewith, means adapted to introduce coolant into one end of the drum assembly, the drum assembly having an opening at its other end for the escape of coolant therefrom after passage through said working gap, said rotor having opening means communicating between opposite sides thereof within the drum assembly, and means providing an opening means communicating between opposite sides of the pole ring means to equalize pressure on opposite sides thereof.

6. An electric coupling according to claim 5, wherein the opening means through the rotor are constituted by a series of the same disposed completely around the center of rotation thereof, and wherein the opening means communicating between opposite sides of the pole ring means is an opening in the pole ring means within the casing.

7. An eddy-current coupling comprising coaxially arranged driving and driven shafts, and axially disposed housing supporting said shafts, annular field coil means in the housing, solid pole rings flanking said coil means and peripherally attached to the housing substantially throughout their peripheries, said pole rings having pressure-equalizing opening means therethrough connecting their opposite sides in the housing, a rotary drum assembly attached to one of said shafts and located within the pole rings to form a parasitic gap therewith, said drum assembly having coolant inlet means at one end and coolant outlet means at the other end, a toothed rotor within the drum assembly and attached to the other shaft and forming a working gap within the drum assembly, said rotor having pressure-equalizing openings connecting its opposite sides.

8. An eddy-current coupling according to claim 7, including an opening through the housing above its bottom and connecting the atmosphere with space between the pole rings.

9. An eddy-current coupling according to claim 7, wherein the rotor is attached to its shaft by means by of a neck portion narrower than the lengths of its teeth and wherein said openings therein are located.

10. An eddy-current coupling according to claim 9, wherein the wall of said drum assembly includes axially disposed passages therethrough providing coolant inlets leading through said wall from within the drum assembly and additional coolant outlets therefrom leading into the housing.

11. An eddy-current coupling according to claim 10, including baffle plate means in the drum assembly adjacent said inlet coolant means and forming a divider for one flow of coolant from said coolant inlet to said working gap and another flow to said passages through the wall of the drum assembly.

12. An eddy-current coupling comprising coaxially arranged driving and driven shafts, an axially disposed housing supporting said shafts, annular field coil means in the housing, solid pole ring means adjacent said coil means and peripherally attached to the housing so as to divide its end portions, means providing upper pressure-equalizing passages across said pole ring means and connecting said end portions, a rotary drum assembly attached to one of said shafts and located within the pole ring means to form a parasitic gap therewith, said drum assembly having inlet openings at one end and outlet openings at the other end, a toothed rotor within the drum assembly and attached to the other shaft and forming a working gap within the drum assembly, said rotor having pressure-equalizing openings connecting its opposite sides.

13. An electric coupling comprising a casing containing pole ring means and an exciter coil therefor, a rotary inductor drum assembly within said ring means and forming an outer parasitic gap therewith, a polarized rotor within the drum assembly and providing an inner working gap therewith, means adapted to introduce coolant into one end of the drum assembly, the drum assembly having an opening at its other end for escape of coolant therefrom after passage through said working gap, said pole ring means having at least one opening located only in its upper portions and forming communication between opposite sides thereof within the casing in addition to communication between its opposite sides formed by sand parasitic gap.

References Cited by the Examiner
UNITED STATES PATENTS 3,119,034  1/64  Luenberger _____ 310—105

MILTON O. HIRSHFIELD, Primary Examiner.
DAVID X. SLINEY, Examiner.